W. G. CHRISTOPHERSON.
PROCESS OF FORMING ANNULAR ARTICLES.
APPLICATION FILED DEC. 31, 1915

1,322,760.

Patented Nov. 25, 1919.

WITNESS:

INVENTOR
William G. Christopherson,
BY
HIS ATTORNEY

UNITED STATES PATENT OFFICE.

WILLIAM G. CHRISTOPHERSON, OF DETROIT, MICHIGAN, ASSIGNOR TO MORGAN & WRIGHT, A CORPORATION OF MICHIGAN.

PROCESS OF FORMING ANNULAR ARTICLES.

1,322,760.  Specification of Letters Patent.  Patented Nov. 25, 1919.

Application filed December 31, 1915. Serial No. 69,572.

*To all whom it may concern:*

Be it known that I, WILLIAM G. CHRISTOPHERSON, a citizen of the United States, residing at Detroit, county of Wayne, and State of Michigan, have invented certain new and useful Improvements in Processes of Forming Annular Articles, of which the following is a full, clear, and exact description.

This invention relates to methods of manufacturing annular articles, and one embodiment will be described in connection with the manufacture of that class of devices known as reliners and comprising rubber treated fabric plies assembled in unitary integral association and adapted to encircle and reinforce a tire casing on the inner surface thereof.

In constructing a reliner the usual practice, in a general way, embodies the steps of assembling rubber treated bias fabric strips to form a laminated unit, applying the laminated unit in a single convolution upon a shaping core similar to the core upon which a tire is built, pounding down the same with wedge shaped blocks to partake of the configuration of the core, wrapping the product spirally with fabric, and vulcanizing it in open heat to impart permanent shape to the reliner.

The fabric condition of the reliner produced by the above method is not satisfactory, primarily because of mutilation or mashing of the fibers of the fabric and displacement of the rubber from the blows of the blocks during the hammering down operation. The process is furthermore wasteful in the destruction of the wrappings by burning during vulcanization, and in the time taken to apply and remove the wrappings, and in the great number of cores required since only a single reliner is produced at one time.

To obviate poor fabric conditions, the present invention effects progressive shaping of the reliner by increments or instalments prior to and while passing of the same onto the core. The invention obviates entirely the use of wrappings during vulcanization and decreases the number of cores used several hundred per cent., both of these results being obtained by winding under tension on each single core a plurality of convolutions of the laminated unit, and fixedly securing the end of the same in place, the product thus prepared being capable of undergoing vulcanization without wrappings, as will hereinafter be more fully explained.

The invention can be readily understood from the following description taken in connection with the accompanying drawing, in which—

Figure 1:
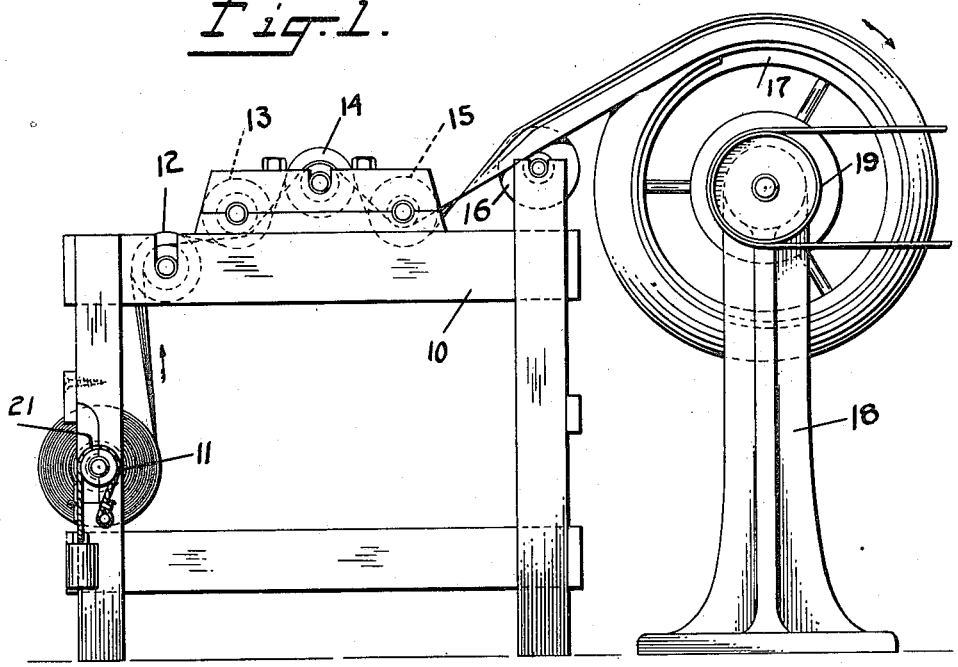
Figure 1 is a side elevation of an apparatus suitable for carrying out the invention.
Figure 2:
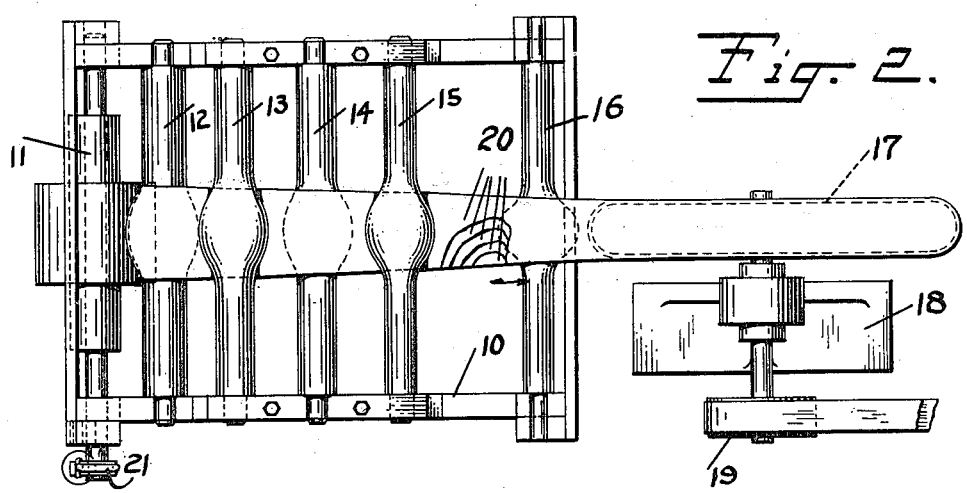
Fig. 2 is a plan view of the parts shown in Fig. 1.

Referring now to the drawing, 10 designates a suitable frame upon which is supported a series of rollers 11, 12, 13, 14, 15 and 16. The rollers 12 to 16 inclusive are bulbed in profile, and are approximately of equal diameter at the center. The bulbed rollers diminish in radius of curvature from the roller 12 to the roller 16 inclusive, so that each succeeding roller attains more nearly the profile of the desired final shape of the reliner as the rollers progress in the series from the roller 12 to the roller 16. This frame with its rollers is designed to be positioned in rear of a ring core 17 similar to the usual and well known type used in building tires. The ring core is supported upon a standard 18 and is adapted to be power driven from a pulley 19 as usual.

In constructing the reliner, a plurality of plies 20 of fabric cut on the bias are assembled in superposed relation. Prior to assembly all of the plies are treated with rubber on both sides with the exception of the top ply which has the outside bare. The laminated unit, at this stage, is in the form of a substantially flat strip of layers of fabric alternating with layers of rubber and can be stretched longitudinally and its shape readily changed, due to the fabric being cut on the bias. This strip is preferably formed of such length as to produce a plurality of reliners, as for instance six, that is, there will be sufficient length of the strip to encircle the ring core in six convolutions.

The above described strip is spooled upon the roller 11 and the end thereof is carried over the roller 12, under the roller 13, over the roller 14, under the roller 15, over the roller 16, and is finally applied to the surface of the ring core to which it adheres. The supply roller 11 is retarded against free rotation by means of a brake 21 or otherwise so that during rotation of the ring core to draw the strip upon its surface there will exist a tension in the fabric sufficient to simultaneously stretch all of the layers of the laminated strip longitudinally. In some instances this may be dispensed with if desired since the friction exerted by the fabric in being pulled over the rollers will be sufficient to produce a stretch of the fabric.

In operation, the ring core is started after the end of the laminated unit has been applied thereto, and the fabric is thereupon drawn from the supply roller 11, over and under the various bulbed rollers. During passage over the latter the shape of the fabric is progressively changed by increments or instalments, this change taking place appreciably between the rollers. Obviously, points near the central circumference of each roller will travel faster than points near the outside circumference where the curved profile of the roller comes nearest to the axis of the roller, consequently a differential of stretch will occur in the unit between corresponding points in each two adjacent bulbed rollers, the stretch being greatest near the central circumference and being least near the outer circumferences of the rollers. This change being made progressively from the original flat shape to the final shape partaking of a curved profile transversely of its width, and by instalments or increments, gives the fabric an opportunity to set somewhat between succeeding changes with the result that the tendency of longitudinal contraction in the strip is reduced to a minimum if not positively obviated.

When a desired number of rounds or convolutions of the shaped strip have accumulated upon the surface of the ring core the latter is stopped and the strip is severed from the supply. The end of the strip on the ring core is then fixedly secured in place by tying the same or confining the same in any desired manner against movement. By virtue of the strip having one side bare of rubber, a bare fabric surface will exist between and prevent adhesion of the contacting convolutions during vulcanization. The ring core with the applied strip is then put in the vulcanizer without wrappings of any kind and there subjected to a sufficient temperature for a sufficient length of time to produce the desired degree of vulcanization in the rubber between the layers of the strip and in the interstices of the layers whereby the reliner is set and fixed in the shape given to it by the bulbed rollers and core. After the desired vulcanization is completed, the core is removed from the vulcanizer and the strip unwound therefrom and turned inside out. A coat of cement is then applied to the bare side of the strip and the strip is then cut into the desired lengths for producing reliners for various diameters of tires.

Although I have described one embodiment of the invention in connection with the manufacture of reliners, I do not intend to limit the invention to this specific article, as other annular articles, such as for instance tire casings, may be equally well produced by this process.

Having thus described my invention what I now claim as new and desire to protect by Letters Patent is:

1. The method of manufacturing annular articles consisting of superposing a plurality of strips of rubber treated bias fabric to form a unit, stretching the unit by gradual increments to impart to it a definite concavo-convex profile transversely of its length, forming a plurality of convolutions of the so-shaped unit by winding it lengthwise upon an annular mandrel having a peripheral surface convex in cross section, said material being fed to the mandrel with its concave surface disposed in correspondence with the cross sectional peripheral curvature of the mandrel, and vulcanizing the so-assembled convolutions.

2. The method of manufacturing annular articles consisting of superposing a plurality of strips of rubber treated bias fabric to form a unit, stretching the unit by gradual increments to impart to it a definite concavo-convex profile transversely of its length, forming a plurality of convolutions of the so-shaped unit by winding it lengthwise upon an annular mandrel having a peripheral surface convex in cross section, said material being fed to the mandrel with its concave surface disposed in correspondence with the cross sectional peripheral curvature of the mandrel, vulcanizing the so-assembled convolutions, unwinding the convolutions, and cutting the unwound convolutions into desired lengths.

3. The method of manufacturing annular articles consisting of superposing a plurality of strips of rubber treated bias fabric to form a unit, stretching the unit by gradual increments to impart to it a definite concavo-convex profile transversely of its length, forming a plurality of convolutions of the so-shaped unit by winding it lengthwise upon an annular mandrel having a peripheral surface convex in cross-section, said unit being fed to the mandrel with its concave surface disposed in correspondence with the cross-section peripheral curvature of the mandrel, vulcanizing the so-assembled convolutions, unwinding the convolutions, cutting the unwound convolutions into desired lengths, and turning the cut lengths inside out.

Signed at Detroit, Mich., this 21st day of December, 1915.

WILLIAM G. CHRISTOPHERSON.